United States Patent
Anglés

(10) Patent No.: US 8,283,026 B2
(45) Date of Patent: Oct. 9, 2012

(54) METHOD FOR PRODUCING HIGHLY MECHANICALLY DEMANDED PIECES AND SPECIALLY TOOLS FROM LOW COST CERAMICS OR POLYMERS

(75) Inventor: Isaac Valls Anglés, Barcelona (ES)

(73) Assignee: Rovalma, S.A., Barcelona (ES)

( * ) Notice: Subject to any disclaimer, the term of this patent is extended or adjusted under 35 U.S.C. 154(b) by 118 days.

(21) Appl. No.: 12/808,521

(22) PCT Filed: Dec. 16, 2008

(86) PCT No.: PCT/EP2008/067610
§ 371 (c)(1),
(2), (4) Date: Oct. 22, 2010

(87) PCT Pub. No.: WO2009/077524
PCT Pub. Date: Jun. 25, 2009

(65) Prior Publication Data
US 2010/0304095 A1     Dec. 2, 2010

(30) Foreign Application Priority Data

Dec. 17, 2007 (ES) .................................. 200703345
Sep. 19, 2008 (EP) ..................................... 08164726

(51) Int. Cl.
*B32B 5/12* (2006.01)
(52) U.S. Cl. ................. 428/300.7; 428/34.1; 428/294.7; 428/34.4
(58) Field of Classification Search ................. 428/34.1, 428/34.4, 294.7, 297.1, 300.7
See application file for complete search history.

(56) References Cited

U.S. PATENT DOCUMENTS

| 3,631,745 A | 1/1972 | Walkey et al. |
| 4,588,443 A | 5/1986 | Bache |
| 4,708,626 A * | 11/1987 | Sakai et al. ................... 425/398 |

(Continued)

FOREIGN PATENT DOCUMENTS

DE       1015595       9/1957

(Continued)

OTHER PUBLICATIONS

Gartnerplatzbrucke Kassel: "Was ist UHPC?" http://www.uni-kassel.de/hrz/db4/extern/wdbube/index_was_ist_uh ... (2008) 1 page.

(Continued)

*Primary Examiner* — N. Edwards
(74) *Attorney, Agent, or Firm* — Michael Best & Friedrich LLP

(57) ABSTRACT

The present invention is directed to a method for the production of highly demanded pieces at low cost. The method is especially well suited for deep drawing dies, but also any other type of tooling. It is also very well suited for machine components of big dimensions and with high mechanical solicitations, like rotors and cages in wind mills and other big machines. The pieces or tools are cast with a low cost ceramic, like a high resistance concrete (with special mention to HPC or UHPC) or a low water admixture castable or any other low cost high mechanical resistance material (low cost ceramics or high resistance polymers are especially suited). Once cast, the working surface of the die or piece is coated with a metal, an intermetallic or a high performance ceramic. Projection or deposition techniques are used to obtain the high value working surface.

10 Claims, 2 Drawing Sheets a)

b)

U.S. PATENT DOCUMENTS

| | | | |
|---|---|---|---|
| 5,522,926 A * | 6/1996 | Richard et al. | 106/644 |
| 5,879,817 A | 3/1999 | Brown, Jr. et al. | |
| 6,224,943 B1 | 5/2001 | Knepper et al. | |
| 7,402,203 B2 * | 7/2008 | Burdin et al. | 106/643 |
| 7,641,731 B2 * | 1/2010 | Chanut et al. | 106/644 |
| 2004/0050302 A1 * | 3/2004 | Casanova et al. | 106/640 |
| 2006/0243168 A1 * | 11/2006 | Burdin et al. | 106/640 |
| 2007/0163470 A1 * | 7/2007 | Chanut et al. | 106/724 |
| 2010/0304095 A1 * | 12/2010 | Valls Angles | 428/188 |
| 2011/0129380 A1 * | 6/2011 | Angles | 419/38 |
| 2012/0037045 A1 * | 2/2012 | Fonollosa et al. | 106/709 |

FOREIGN PATENT DOCUMENTS

| | | |
|---|---|---|
| DE | 2900909 | 7/1979 |
| DE | 69908273 | 4/2004 |
| DE | 202006010493 | 8/2006 |
| EP | 0052380 | 5/1982 |
| EP | 0273181 | 7/1988 |
| EP | 0451042 | 10/1991 |
| EP | 0669299 | 8/1995 |
| EP | 0979717 | 2/2000 |
| GB | 1089773 | 11/1967 |
| GB | 2250703 | 6/1992 |
| JP | 60108122 | 6/1985 |
| JP | 62093037 | 4/1987 |
| JP | 63309332 | 12/1988 |
| JP | 2104424 | 4/1990 |
| JP | 2251323 | 10/1990 |
| JP | 4107251 | 4/1992 |
| JP | 04299106 | 10/1992 |
| JP | 2002346663 | 12/2002 |
| JP | 2003170410 | 6/2003 |
| JP | 2004175112 | 6/2004 |
| WO | 87/01627 | 3/1987 |
| WO | 03/039779 | 5/2003 |

OTHER PUBLICATIONS

International Search Report and Written Opinion for Application No. PCT/EP2008/067610 dated Jun. 18, 2009 (14 pages).

* cited by examiner

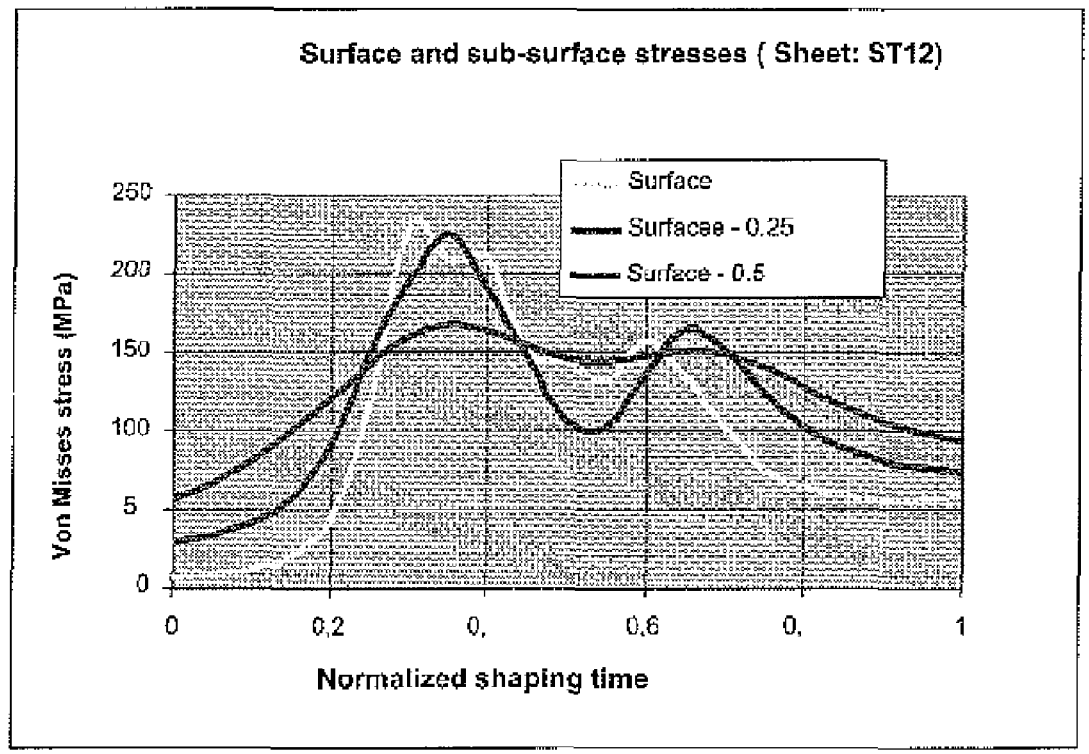
- Fig. 1 -

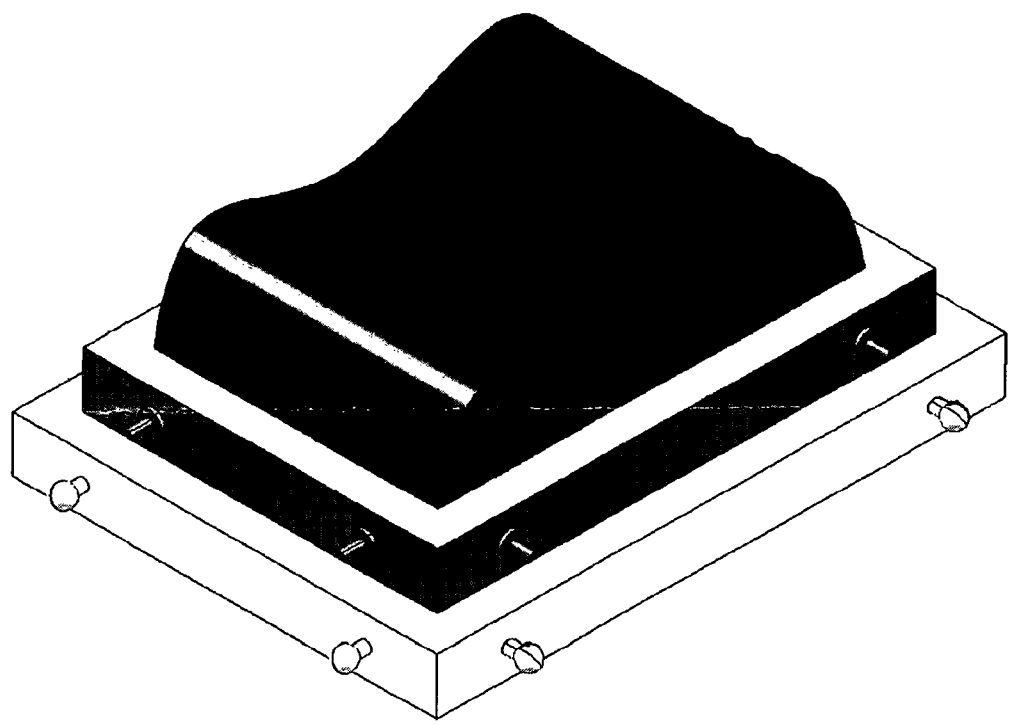
a)
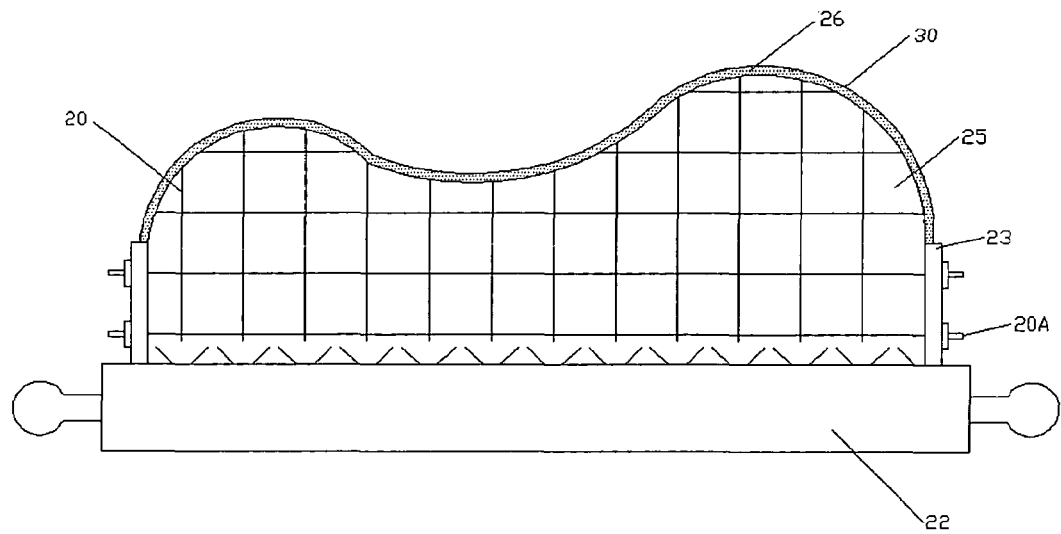
b)
- FIG. 2 -

METHOD FOR PRODUCING HIGHLY MECHANICALLY DEMANDED PIECES AND SPECIALLY TOOLS FROM LOW COST CERAMICS OR POLYMERS

FIELD OF THE INVENTION

The present invention is directed to a method to fabricate highly solicited pieces, and especially well suited for tools and dies, by casting a low cost high resistance base material (like high and ultra-high resistance concretes [UPC, UHPC], high resistance low water admixture castables or high resistance thermo-setting polymers) to the desired shape, and then at least partially coating the surface with a metal or a technical ceramic. Usually projection or deposition techniques can be employed to provide the metallic layer like cold spraying, CVD, PVD, or thermal spray techniques like arc, plasma, laser, oxi-fuel . . . . The metallic layer can also be partially or completely melted and/or shot blasted. Technological ceramics can also be projected or deposited. Metallic liners or rings can be used in the case of revolution figures.

BACKGROUND OF THE INVENTION

Nowadays, techniques for the construction of concrete tools exist, as for instance in U.S. Pat. No. 4,588,443. However, these methods cannot be applied to sheet drawing or other highly demanded applications as the mechanical resistance is lacking, because the resistance of the used concretes or metal layers in the working zones is too low. There are also techniques to obtain reinforced polymeric concretes of high resistance (GB2250703A), reinforced concretes with fibres for the construction of injection moulds (JP2003170410) or the application of reinforced highly resistant polymers (WO 03/039779 A1). However, in all these cases the possibility of using these techniques for shaping high quality sheets and other metal to metal contact applications is very small. The elements which are used to reinforce the concrete or polymer scratch the drawn sheet, and the superficial micro-defects permit the deposit of sheet particles which in turn produce adherences in sheets which will be drawn afterwards. In order to avoid this effect, some techniques were developed by surface melting of a metallic layer (DE69908273T2) or by employing a layer which can be used as mould for the concrete mix (JP2002346663, DE202006010493U1).

In both cases, the quality of the union metal-concrete is only satisfactory for few applications.

The use of concrete as support element and not as principal resistant element (as it is the case in the present invention) in the produced pieces by thermal projection of metals is known. Normally, these techniques in which the concrete is used as support element, the concrete is cast in the metallic piece once it is obtained by thermal projection on another model (JP63309332, U.S. Pat. No. 3,631,745, JP2104424, JP2251323).

Realising thermal projection on concrete when the concrete is the resistant element is also known in protecting concrete against corrosion or against fire as it is described in U.S. Pat. No. 6,224,943, EP0669299 A2, and U.S. Pat. No. 5,879,817. Thermal projection on low resistance resins is also known in the production of low cost models where the mechanical requirements are low (JP60108122).

There are many techniques for inserting layers by thermal projection which are wear or corrosion resistant in comparison to the metallic substrates, in particular, ceramics and hard metals (JP2004175112).

DETAILED DESCRIPTION OF THE INVENTION

In the sheet processing industry, the tool costs represent in general an important part of the costs of the produced pieces. For that reason, the fabrication of low cost tools is very interesting, in particular, as some of these tools do not need to have a very long life cycle.

In many other industries the usage of big structural or machine components represent a high cost, especially when those elements are highly solicited and expensive cast metals or even forged metal have to be employed to withstand the high involved loads. This is often the case in energy transforming machines and processing machines.

The majority of the tools which are used to shape sheets are manufactured by casting iron alloys and subsequent final machining of the desired geometry. They are also produced starting from metallic blocks which are machined until they have got the desired geometry. However, this normally implies the removal of great amounts of material by machining.

The present invention is especially advantageously for manufacturing huge deep drawing dies. Generally, deep drawing dies are manufactured by casting steel according to the following process:

obtaining models (the most commonly employed material is expanded polystyrene, but others can be used too, in particular, when the final machining shall be minimized, since the dimensional stability of expanded polystyrene is low)
  obtaining sand moulds which are put around the model
  casting the melt steel mix in the sand mould (the melt itself eliminates the model, in the case of not using polystyrene the model can previously be taken away and the melt can be casted in the hollow cavern)
  taking away the mould and cleaning the melt
  heat treating of the melt optional
  final machining
  final heat treatments In some cases and, above all, if there is big time pressure and if the tool is intended for the production of small series, the die is manufactured by chip removal machining from a metallic block which is easy to machine and which commonly is made of an aluminium alloy or a low alloyed steel.

The properties which the finished deep drawing die needs to have are:

dimensional stability in order to guarantee that the desired piece will be obtained. This implies that the employed material needs to have sufficient mechanical resistance. The aluminium that is commonly used for that purpose has normally a resistance of 300 MPa, and the steels commonly used normally have a mechanical resistance of more than 400 MPa.
  toughness in order to guarantee that the tool does not break. That's the mean reason metals are used.
  wear resistance in order to guarantee that the obtained geometry of the piece will not significantly change during the tool's life. This is basically the reason why different materials are used depending on the required tool life and the shaped sheet type.
  surface condition in order to guarantee a good surface quality of the produced piece. The tool should not scratch the produced component. Scratches can be caused by the presence of very abrasive and big particles in the tool material which are surrounded by a far more deformable or degradable matrix. This increments the contact pressure as the area of real contact is drastically reduced. Scratches or marks on the piece can also be caused by adherences if there is an affinity between the piece's material and the tool. Or they can be caused by holes or surface defects on the tool in which may deposit some piece's material which in turn has a high affinity with subsequent processed pieces.

A fifth requirement could be also considered: namely the necessity of obtaining pieces with elevated dimensional tolerances. This is to say that the tool needs to have a high dimensional accuracy and stability.

All of the above requirements or at least some of them are shared by many other applications, and thus the solution presented in the present invention can be applied. This is the case of many structural and active parts in machines. In the case of big machine parts the economic advantage of applying the present method is even bigger. Cages, axis, rotors, rolls, sliding contacts, motor blocks, machine benches and many others are candidates to the applying of the present invention.

Furthermore, the present invention allows providing the produced piece with very diverse surface or subsurface functionalities like: heating, cooling, sensory, actuator, conducting or inducting in almost any possible desired pattern. This is extremely interesting for an innumerable range of applications, to serve as an example: Inductors, stators, hot forming cooled prototype dies . . . .

Given the requirements of the tools, the present invention provides a method of obtaining highly solicited pieces, particularly advantageous for tools like big deep drawing dies, with the required characteristics and at considerably lower costs by constructing the objective piece with a low cost base material and with a surface layer which is made of a more expensive material and which provide the necessary properties which were described in the previous paragraphs. The layer is normally added by a thermal projection or deposition technique. Usually, the added layer is of a metallic nature, very often steel. However, in the case of pieces which need to have a high wear resistance or electric or thermal insulation effect, the layer can also be a technical ceramic, finally the superficial layer can also be an intermetallic compound or a composite encompassing any of the three materials families described (metals, intermetallics and technical ceramics). In the case of piezoelectric, piroelectric, strong magnetic or other sensor or actuator effects, normally ceramics with the desired properties are projected often in combination with a metallic support layer. In the case of determined thermal or electric conduction paths in the surface of the produced piece, materials with different corresponding property (thermal or electric conductivity or magnetic permeability mainly) are projected in the desired form trough proper masking.

Accordingly, a first aspect of the invention relates to a piece or tool comprising a ceramic or polymeric base material having a mechanical resistance higher than 60 MPa which is at least partially coated with a metal, an intermetallic compound or a technical ceramic.

A second aspect of the invention relates to a method for the manufacturing of pieces or tools comprising the following steps:
 a) casting a ceramic or polymeric base material having a mechanical resistance higher than 60 MPa into the desired shape;
 b) allowing the cited base material to at least partially solidify or harden; and
 c) at least partially coating the surface of the piece resulting from step b) with a metal, an intermetallic compound or a technical ceramic.

Embodiments of the present invention are described below, by way of examples only:

In the present invention, the low cost base material employed is usually a concrete or a low water admixture castable. A high resistance thermo setting polymer might also be used, although it is a bit less suited. Alternatively, a polymer of high resistance or any low cost ceramic, with sufficient mechanical properties, can be used. The required resistance level of the support base material depends on the sheet which has to be shaped (on its mechanical resistance, thickness and drawing geometry) and, above all, on the thickness of the employed surface layer. For huge dies for skin production in the automotive industry, sheets of high ability for drawing with a mechanical resistance of about 240 MPa and an elastic limit of about 200 MPa are used. In the image 1 can be seen that for a drawing geometry with quite acute angles a surface resistance of more than 200 MPa may be required, but only 0.5 mm away from the surface the required resistance is lower than 150 MPa. There are many low cost materials with a compression resistance higher than 100 MPa, in particular, concretes and thermo stables. Conventional concretes on the basis of porcelain (porcelainates) with the addition of fluxing agent and/or silica can achieve resistances of 140 MPa. There are polymeric cements with a resistance of more than 120 MPa. Premixed concretes on the basis of low humidification cements and fibre reinforcement ("low water admixture castables") can reach resistances of more than 250 MPa. Also thermosetting polymers with a resistance of more than 300 MPa can be used as a base material or to partially replace the ceramic. This polymer base materials are also very good candidates to fill up the superficial voids that can remain during the casting of the base material especially if those voids are detrimental for the application of the metallic or technological ceramic layer. If the used thermo projection process exposes the basis to a high temperature or if the final application requires particular resistances at a particular temperature, refractory concretes on the basis of aluminates or low water admixture cements on the basis of alumina can be employed. The characteristics of many of these concretes can be substantially improved if an internal and/or external vibrator is used during the mixing process. Some of these low cost materials with a higher resistance need a high energy input mixing. Some of these materials need an aging process which may require their exposition to high temperatures. Other materials, which can be used for particular applications, are compositions of a polymeric die with a metallic or ceramic reinforcement, also reinforcements of low cost ceramics, or are compositions of a ceramic die with a metallic or polymeric reinforcement.

In some instances of the present invention it is interesting that the low cost base material has a mechanical resistance as high as possible. This is for example the case of many of the machine elements and also the case when using the present invention to fabricate tools to shape very hard AHSS sheets. In this case extreme high resistance concretes can be used. Several tricks can be employed to raise the already high mechanical resistance of high resistance concretes (HPC) like for example: the application of a pressure step to the piece right after casting it to suddenly evacuate some water of the mix, required to let the concrete flow during the filling, but not desirable during the setting of the concrete (it might require a special mould construction), in this way mechanical resistances above 400 MPa are attainable; usage of metallic balls or aggregates (can also be coated) to replace some of the arid, in this way mechanical resistances above 1000 MPa are attainable; usage of nanometric metallic powder (can also be coated) to partially replace cement, in this way mechanical resistances above 1300 MPa are attainable, the preceding strategies can also be combined together. When the tensile strength of the base material is also of significance, the usage of metallic fibres (different natures and lengths), polymeric or textile fibres and other reinforcements can be very advantageous.

In some instances of the present invention it is appreciated the low weight of the components that can be attained. To further enhance this characteristic, the weight of the base material can be lowered by intentionally leaving voids in the low cost base material, or mixing into the mix before casting some low weight material. An illustrative example of this practice would be the addition of expanded polyesthirene in the shape of balls or chuncks of the desired size, after the casting of the ceramic this added material can be eliminated to leave voids on the concrete (material can be eliminated with temperature, acid, any other mean) or simply be left in place. Other eliminable materials can be employed if voids are desirable, or low weight material to be left in the base material like such as low density polymer, cellulose, wax, in balls or particles. The voids in the base material can also be left by blowing a gas during the filling of the mould.

For the fabrication of the mould, which contains the extreme high resistance concrete or other low cost material of extreme high resistance in order to give it the desired geometry, in general, expanded polystyrene is used. For applications for which a major precision is required in order to avoid machining or in order to be able to make ceramic coatings, normally, materials of major dimensional stability, such as polypropylene of high density or wood components, are used. If available also a sheet with the desired shape can be used. In this case putty is employed in order to have a thick separator which is easy to eliminate and which will be replaced afterwards by the thermally projected layer. A lot of materials and processes can be used in order to obtain the model.

In comparison to metals, the major fragility of ceramics and high resistance polymers is a problem. If a die with a major tolerance regarding possible beats or falls should be obtained, the base material should be armoured. In case of low humidification cements ("low water admixture castables"), metals with a similar linear thermal expansion coefficient to the base material should be used in order to avoid die cracks during the aging process. Even in the case of dies which are exposed to considerable temperature changes it is convenient to use metals of a similar linear thermal expansion coefficient as the base material itself: iron or nickel (or any alloy having one of those materials as the base alloying element) for the concretes on the bases of porcelanates, and polymeric concrete, invar, constantan, tungsten or molybdenum (or any alloy having one of those materials as the base alloying element) for cements with a high content of alumina and/or silica.

The concretes are resistant against high compression loads, but their resistance under tensile stress state is low. Almost all ceramics and many high resistance polymers have a poor tensile strength. That is the main reason for the pieces of the present invention to be often armoured. Another form of assuring that the piece is not exposed to tensile stresses is the use of a hoop or external metallic compression ring or frame. The hoop or ring can also be used to prestress the rods of the armouring. In this way, a more compressive tensional state in all piece zones can be obtained which permits the fabrication of more complex geometries. For some applications though, the tensile mechanical resistance of the low cost base material suffices. It is normally also advantageous, especially when the working layer is applied by projection or deposition of a metal, to allow the rods of the armouring to barely stick out of the low cost base material on the surfaces that are to be projected to provide an extra anchorage to the projected or deposited coating.

It is often interesting to provide the piece with a metallic base, a plate, frame or cast that can merely serve transportation or montage/anchorage means, but can also provide resilience in the case of accidents, if the metallic plate, cast or frame is provided with spikes and bonded to the low cost material when casting or still fresh.

In the present invention, a metallic film often being of steel or other metallic alloy (based on Fe, Ni, Co, Al, Mo, W or others) will be laid on the surface in order, to enhance the toughness in the working zone, to withstand the loading on the surface, to facilitate machining and, above all, to permit a good superficial finishing of the produced piece.

Other materials than can be used for the surface working layer, providing the functionality required, are intermetallic compounds and technical ceramics (or any compound encompassing them like is the case of hard metal). Projection and deposition methods are the best candidates to attain this metallic, intermetallic or technical ceramic surface layer, but dipping into a melt or slurry or highly bonding particle containing paints (like sol-gels) can also be employed, especially when a first projected/deposited intermediate layer is already present. Thermal projection in one of its variants (regardless of: the speed and means of acceleration/transportation of the projected material, the means of heating up the projected material or transporting fluid, the shape and size of the projected material [powder, other particles, rod, . . . ], whether the projected material softens or partially melts, and whether it can be considered cold or hot spraying) is then a very suitable process to attain the superficial layer: cold spray projection, plasma projection ("Plasma spray"), HVOF projection ("High Velocity Oxyfuel Spray"), HFPD projection ("High Frequency Pulse Detonation"), oxy-acetylene projection ("flame spray"), arc projection ("electric-arc spray"), or any other. The surface coating can also be made by means of deposition of a fluid or a vapour (CVD—chemical Vapour Deposition, PVD—Physiscal Vapour Deposition, EB—electron beam bombardment, Ion Implantation, Plasma vapour deposition . . . ). Some of these processes can enhance some characteristics of the projected/deposited layer and of the bonding quality if they are realised in a controlled atmosphere chamber (at atmospheric pressure as well as under pressure/depression). Any other process which permits the insertion of a sufficiently thick layer and which provides a good union between layer and basic material can be used such as cathode coating, or dipping into a melt of the desired material or a slurry containing the desired material which is afterwards dried out, etched or burned to eliminate the carrier. In every case, the chosen technique depends on the required properties at the interface with the base low cost ceramic and the working surface, which in turn depend on many process parameters and geometry conditionings. One very important aspect to be considered are the residuals tensions stresses on the projected/deposited layer left by the different possible techniques and which are very often in turn dependant on the thickness of the layer.

When constructing pieces with cylindrical symmetry, the superficial layer can be applied as a solid body. For external cylindrical symmetry like is the case in any type of axis and rolls, a metallic ring or sleeve can be used as working surface, which can be hooped by heating it up and thus expanding it, entering it with the aid of a press and letting it cool down and thus contracting against the base low cost material improving the anchorage. For internal cylindrical symmetry like is the case of a cylinder hole in a motor block, or many others, a metallic liner can be used as working surface (it can also be pressure mounted and deep frozen and the low cost material heated up to improve anchorage).

As the desired functionality on the tool's surface is different in every application, there are endless materials which can be applied as superficial layer. In particular, steels with the desired hardness, but with an enhanced mechanization, steels with lubricant or anti-adherent particles, materials with an optimized tribologic behaviour and/or materials with an extreme wear resistance, as well as the aforementioned materials with specific, thermal, magnetic, electric, piezo- or piro-electric, or any other specific property can be projected/deposited. In principle, every type of metal, metallic alloy, intermetallic compound or ceramic or even compounds of them can be inserted.

When coating with a metal the adherence has a very remarkable influence on the overall performance, therefore improving the adherence at the interface is of great importance. To do so metallic fibres can be employed. Normally the fibres are mixed with the low cost base material and the cast together, unless the fibres are also desired in the body of the low cost base material to increase resistance in tensile stress states, the fibres can be conducted to the surface, and preferably oriented orthogonal to it, to have the biggest fibre pull-out resistance. This can be achieved by applying electric or magnetic fields to orient the fibres. For example some permanent magnets can be glued to the shaping mould so that when filling the low cost material into which a certain volume percentage of ferromagnetic fibres has been incorporated, and during the vibration of the mix, the fibres can flow towards the magnets aligning with the force lines which run fairly perpendicular to the surface. To further increase the amount of metal on the projecting surface, the piece can be shot penned or blasted to spread the metallic fibres onto the surface. The projected metal adheres especially well to the metal of the base material, even more when this can plastically deform and also some diffusion bonding can be attained if temperature is high enough during the projection or in a posterior treatment.

When projecting a metal on a ceramic or polymer the bonding is mainly a mechanical bonding, and thus it is better when the surface is somewhat rough, providing good anchorage points. When the base material has metallic fibres, the anchorage is also greatly improved if those fibres are activated prior to the thermal projection or deposition (activation is understood as removing all superficial oxides, to have a fibre surface which is as metallic as possible. For this purpose, usage of sand blasting (with corundum, glass balls or microparticles, ...) or shot penning (specially with metallic balls) to activate the metallic fibres and low cost base material surface are specially indicated, but any other method can be employed (grinding, polishing, roughening ...).

The application of an intermediate layer can be considered in order to enhance the adherence of the surface working layer. Such layers could be, for instance, thermo stable layers which are humidity resistant and resistant against alkaline components (in order to avoid the corrosion of the metallic layer used in the inter phase). Such method is described in JP4107251.

In order to enhance the adherence of the mechanically projected layer, a superficial porosity can be produced in the base material by using models which degas, by corrosion attack or others. A metallic grid can be put on the model's surface. The concrete will be filled into the model so that the grid is finally on the surface of the concrete tool. Also the metallic rods of the armouring can be fixed in the mould in a way that they look out of the concrete item on each side on which thermal projection/deposition will be realised, in particular, if the material to be employed as a surface working material, or support intermediate layer sticks better on a metallic substrate than ceramic or polymeric.

With some of the described thermal projection techniques, in particular, techniques in controlled atmosphere, densities of more than 99% can be obtained. If a higher surface density is required, a superficial densification treatment can be realised by local fusion. A sufficiently condensed energy source should be applied for local fusion such as laser or concentrated infra-red (HDIR—"High Density Infrared"). Any other method to increase density or even just superficial stress state can be employed, whether they include melting (like welding), or just pure mechanical action (like shot penning).

The projected/deposited surface material may require an integrated or superficial thermal treatment as for instance one or several annealing processes or a superficial treatment such as carbo-nitriding or sulfonizing, superficial tempering (by induction, laser, flame, etc.). Not every combination of low cost base material and surface materials permits every treatment. If an elevated temperature is required for the superficial treatment, the compatibility of the linear thermal expansion coefficients has to be taken into account and also the capacity of the basic material to withstand the required temperature for the treatment.

For the transport and, in particular, in order to fix the tool in the machine, it is often interesting to have a zone in at the fixing side of the tool or piece which is easy to machine. In the present invention, an iron plate frame or melt can be installed for that purpose if required as aforementioned. Metallic profiles are also put in guiding zones when the low cost base material is cast so that they remain embedded in the structure, but are easy to machine afterwards. If an anchoring plate or guiding zones are used they are normally inserted into the mould before casting the base material, or into the ceramic/polymer when still fresh. In general, such a plate or profiles have some welded metallic rods or spikes in order to enhance the anchorage to the low cost base material.

Although the present invention is especially well suited for the fabrication of drawing big dies, it can be used for the fabrication of several tool types with considerable advantages. Some of these tools can be: moulds for plastic injection, moulds for thermal shaping of plastics, moulds for light metal injection, forging dies, dies for open forging, bending dies, cutting dies, etc. In those cases in which the working temperature is higher, there are restrictions for the election of the base material and the material for the thermal projection as the linear thermal expansion coefficients must be compatible.

The present invention is also well suited for the fabrication of machine components, whether mobile, actuator, sensory or structural. It allows reducing weight in many instances, there is a big potential for cost reduction when using the present invention, and also some functionalities, especially those involving complex patterns with a special functionality, are difficult to obtain in any other manufacturing way. In fact almost any high solicited piece or part demanding a complex functionality are susceptible of benefiting from the present invention.

Further embodiments of the invention are described in the attached dependent claims.

EXAMPLES

Example 1

In FIG. 2 an example of the present invention's application can be seen. It is a schematic representation of a drawing die.

Normally, those dies are significantly more complex with blank-holder and lateral cams. The schematic view in FIG. 2a) corresponds to a drawing die which was realised according to the present invention. The image only focuses on the melt support plate and on the hooped high resistance concrete item which is coated by thermal projection HVOF (it has also been realized with cold spray on top of a first thin layer of HVOF projected metal, with equally satisfactory results and even thicker thicknesses attainable) with hot work tool steel and with additives which can be machined easily. In principle, the difference in the working zone between this die and a die which was fabricated by the conventional method can not be seen easily after machining Only the compression frame zone with the prestressed rods reveal the presence of concrete. This mould was obtained by following the following steps:

- Mould fabrication in expanded polystyrene. A box with the negative of the tool form in its internal lower side.
- Placement of the armouring in the mould, with rods which were inserted 0.5 mm into the polystyrene mould in that area of the piece in which afterwards metal will be projected by thermal projection. Some of the armouring rods which are parallel to the working zone are inserted 0.5 m in the polystyrene box in each side in order to be able to fix them in the compression frame afterwards.
- Filling out the cavern with a concrete of very high mechanical resistance (250 MPa after ageing) and low humidity mainly on the basis of aluminium and silica oxide ("refractory low water admixture castable"). An external vibration by means of a vibrating table and an internal vibrating by a needle were realised during the filling out process.
- curing of the full mould with plastics during 24 h
- Extraction of the polystyrene model mould
- Concrete drying and firing in order to eliminate the humidity, reaction at high temperature in a controlled atmosphere oven
- Hooping of the concrete die with a demountable steel box with holes for the long rods
- Prestressing of the rods
- Elimination of superficial dirt from the concrete die and activation of the surface with corundum sand blasting.
- Thermal projection of a hot work steel layer which can be easily machined
- Final machining FIG. 2b) shows a schematic transversal cut in order to demonstrate the difference to a conventional die. The basic transport plate and the die fixture (22) with the rods for the armouring of the concrete can be seen in the image. The armouring rods can also be seen (20). Some of them are prestressed (20A) with the help of the hoop (23). The used high resistance concrete (25) is a "low water admixture castable" on the basis of alumina which was fired in a controlled atmosphere oven. The armouring rods enter the thermal projection layer (26). Finally, the image shows the layer which has received a densification treatment by local laser fusion (30).

Example 2

A selective heating profiling roll was obtained with the present invention. The roll has embedded a conductive heating pattern on its working surface. This profiling roll was obtained by following steps:

- Mould fabrication in expanded polystyrene. An empty cylindrical cage with the negative of the profiling contour was made.
- Filling out the cavern with a 10% metallic fibre reinforcement high mechanical resistance concrete (HPC). An external vibration by means of a vibrating table and an internal vibrating by a needle were realised during the filling out process.
- Moisturized curing of the full mould with plastics during 24 h
- Extraction of the polystyrene model mould
- Concrete drying in order to eliminate the humidity and realize mechanical resistance.
- Elimination of superficial dirt from the concrete die and activation of the surface and fibres with corundum sand blasting.
- cold spray of a low conductivity titanium intermediate layer.
- TiN PVD deposition to further increase isolation.
- Masking, to reveal only the profile that has to have conductive heating capability.
- Cu thermal projection.
- elimination of masking
- Machining the edges of the conductive heating profile from the projected layer.
- Masking to obtain a thin isolation layer around the Cu profile
- Alumina thermal projection.
- elimination of masking.
- masking of the already Cu and $Al_2O_3$ projected zones.
- cold spraying of low thermal conductivity, high resistance Ni—Fe—Mn alloy.
- removal of masking.
- final machining Example 3

A hot stamping prototype die with integrated cooling was obtained. The die has some zones with high conductivity to realize high strength on the produced components, and areas where conductivity is low, to facilitate posterior cutting of the component. This die was obtained by following the following steps:

- Mould fabrication in expanded polystyrene. A box with the negative of the tool form in its internal lower side.
- Placement of tubes with spikes on the Mould surface that corresponds to the working surface, tubes are indented 0.5 mm into the polystyrene, the spikes are looking into the cavity away from the mould. Two independent circuits are used, one for the areas where high heat extraction rate is desirable and thus cooling will be performed, and one for areas where low heat extraction rates are desirable and thus tempering will be employed.
- Placement of the armouring in the mould, with rods which were inserted 0.5 mm into the polystyrene mould in that area of the piece in which afterwards metal will be projected by thermal projection. Some of the armouring rods which are parallel to the working zone are inserted 0.5 m in the polystyrene box in each side in order to be able to fix them in the compression frame afterwards.
- Filling out the cavern with a 10% metallic fibre reinforcement high mechanical resistance concrete (HPC). An external vibration by means of a vibrating table and an internal vibrating by a needle were realised during the filling out process.
- Moisturized curing of the full mould with plastics during 24 h (alternatively, curing by immersion in water after model removal)
- Extraction of the polystyrene model mould
- Concrete drying in order to eliminate the humidity and realize mechanical resistance.

Elimination of superficial dirt from the concrete die and activation of the surface, tubes and fibres with corundum sand blasting.

Hooping of the concrete die with a demountable steel box with holes for the long rods Prestressing of the rods.

HVOF thermal spraying of a 0.5 mm thick molybdenum or aluminium layer.

Masking of the areas where high heat extraction rate is desired.

Cold spray with a thick (20 mm) Ti low heat conductivity alloy of the areas corresponding to component zones to be cut, or areas where the component has to have high deformability and thus low heat extraction rate in the tooling is desired (tempering circuit zone).

Elimination of the masking.

Masking of the already projected low conductivity zones.

Cold spray of a high conductivity molybdenum alloy or aluminium thick (20 mm) layer which can be easily machined.

Removal of the masking.

Final machining.

The invention claimed is:

1. Piece or tool comprising a ceramic or polymeric base material having a mechanical resistance higher than 60 MPa which is at least partially coated with a metal, an inter-metallic compound or a technical ceramic, wherein the coating comprises a cold spray coating.

2. Piece or tool according to claim 1, wherein the base material is selected from the group consisting of:

A concrete based on porcelanate cement with a mechanical resistance higher than 200 MPa;

A low water admixture castable material based on alumina, with or without fibre reinforcement, with a mechanical resistance higher than 200 MPa; and A high or ultrahigh resistance concrete (HPC or UHPC), with a mechanical resistance higher than 150 MPa.

3. Piece or tool according to claim 2, wherein the high or ultrahigh resistance concrete has a mechanical resistance of 250 MPa.

4. Piece or tool according to claim 1, wherein the base material further comprises metallic particles of any shape or size to improve the adherence of the coating.

5. Piece or tool according to claim 2, wherein a portion of the arid of the high or ultrahigh resistance concrete (HPC or UHPC) is at least partly replaced by metallic particles.

6. Piece or tool according to claim 2, wherein a portion of the cement of the high or ultrahigh resistance concrete (HPC or UHPC) is replaced by metallic nanopowders.

7. Piece or tool according to claim 1, wherein the surface coating comprises a wear resistant metal with a mechanical resistance higher than 500 MPa.

8. Piece or tool according to claim 1, wherein the base material is internally armoured with metallic rods and hopped by a compression ring to improve tensile stress resistance of the resulting piece.

9. Piece or tool according to claim 1, comprising tubes superficially or sub-superficially placed in the base material, conferring a cooling/heating functionality to the piece or tool when a fluid is circulated through the tubes.

10. Piece or tool according to claim 1, which is a tool for the forming of plastics, sheet forming or alloy die casting.

* * * * *